United States Patent [19]
Maecker

[11] 3,956,680
[45] May 11, 1976

[54] ELECTRIC COPYING CONTROL DEVICE FOR CHIP REMOVING MACHINE TOOLS

[76] Inventor: Kurt Maecker, Georg-Kalb-Strasse 19, 8021 Gross-Hesselohe, Germany

[22] Filed: July 26, 1973

[21] Appl. No.: 382,902

[30] Foreign Application Priority Data
July 28, 1972   Germany............................ 2237060
May 17, 1973   Germany............................ 2324886

[52] U.S. Cl..................................... 318/578; 318/39
[51] Int. Cl.².......................................... G05B 19/36
[58] Field of Search...................... 318/39, 571, 578

[56] References Cited
UNITED STATES PATENTS

| | | | |
|---|---|---|---|
| 2,927,258 | 3/1960 | Lippel............................. | 318/578 X |
| 3,015,806 | 1/1962 | Wang et al...................... | 318/571 X |
| 3,449,942 | 6/1969 | Stapleton....................... | 318/578 X |
| 3,467,899 | 9/1969 | Inaba et al....................... | 318/578 |
| 3,559,021 | 1/1972 | Bingham, Jr.................... | 318/578 X |
| 3,582,749 | 6/1971 | Wenzel........................... | 318/578 X |
| 3,609,322 | 9/1971 | Burnett et al.................... | 318/578 X |
| 3,619,581 | 11/1971 | Kimura et al................... | 318/578 X |
| 3,707,662 | 12/1972 | Hoffman.......................... | 318/578 |
| 3,728,597 | 4/1973 | Cammens et al................. | 318/578 X |
| 3,742,200 | 6/1973 | Marley............................. | 318/578 UX |

*Primary Examiner*—Benjamin Dobeck
*Attorney, Agent, or Firm*—Walter Becker

[57] ABSTRACT

A template controlled machine tool, especially for machining the crankpins of crankshafts. A first template member rotates in unison with a crankshaft mounted on the work axis of the machine. A second template member is mounted on a carriage so that the second template member and carriage are actuated when the first template member rotates. The machine tool has a work carriage on which a tool is mounted. The work carriage is driven by a motor which receives power from an electric circuit that is controlled in conformity with the movement of the template carriage. Each of the carriages actuates a digital measuring device and a comparator compares the pulses therefrom and adjusts the speed of movement of the tool carriage to maintain the tool carriage position in close conformity with that of the template carriage.

9 Claims, 7 Drawing Figures

ELECTRIC COPYING CONTROL DEVICE FOR CHIP REMOVING MACHINE TOOLS

The present invention relates to a copying control device for chip removing tools with a speed control and a position control in which the templet carriage follows the templet driven by the workpiece spindle motor.

According to U.S. Pat. No. 3,460,434 Maecker issued Aug. 12, 1969, the templet carriage drives a speed measuring device the electric signal thereof representing the rated value for the speed control of the drive for the copying advance of the tool carriage. Furthermore, this copying control device is provided with an additional position control through a returning device for the movement of the tool carriage by a control carriage which latter follows the templet carriage. A synchronous movement conveying means may be arranged between the workpiece spindle and the shaft of the templet drive.

It is an object of the present invention further to simplify the device set forth in U.S. Pat. No. 3,460,434 Maecker issued Aug. 12, 1969, while increasing the safety of the control system of the device so that the precision of operation will be improved.

This object and other objects and advantages of the invention will appear more clearly from the following specification in connection with the accompanying drawings, in which.

Figure 1:
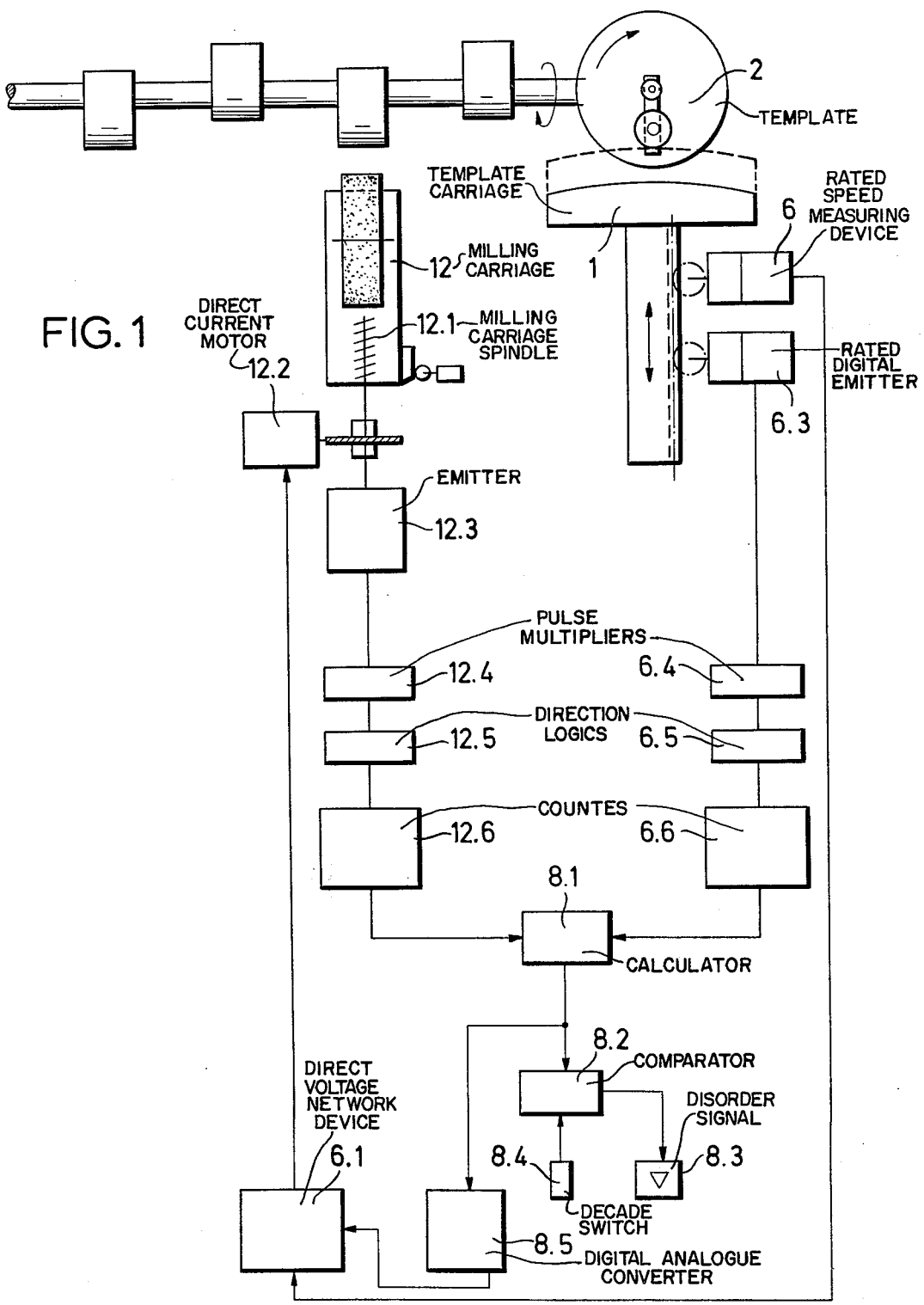
FIG. 1 illustrates the control of the synchronism between templet and milling carriage during a drive by a direct current motor.

The electric copying control device according to the present invention is characterized primarily in that the milling carriage is driven in synchronism with the templet carriage while the position of the two carriages relative to each other and the digital measuring means are controlled and corrected. According to U.S. Pat. No. 3,460,434 Maecker issued Aug. 12, 1969, the milling carriage acted as emitter and the control carriage acted as receiver. The position control was effected between the control carriage and the templet carriage.

In conformity with the present invention, the control carriage can be omitted and can be replaced by an electronic digital return. With the solution suggested according to the present invention, it is to be taken into consideration that the templet carriage is a precise position measuring device. The templet carriage furnishes precise indications of its position by electronic means; and the precision may be set as high as required by the respective working operation.

According to a special embodiment of the invention, the templet carriage operates a speed measuring device, for instance a tachometer, which through a thyristor-direct-current power supply unit controls a direct current motor which through a suitable stepdown transmission drives the milling carriage. The templet carriage at the same time drives a digital emitter, the pulses of which are stored in a counter.

The speed measuring device sets the basic speed for the drive of the milling carriage as is the case also with the above mentioned Pat. No. 3,460,434 Maecker issued Aug. 12, 1975.

The drive of the speed measuring device as well as of the digital emitter by the templet carriage may be effected by a gear rack through a pinion meshing therewith. The digital emitter may, for instance, per one revolution of the pinion emit 2500 pulses electronically to the rack. These pulses are multiplied by four in a well known manner so that per one revolution of the pinion of the digital emitter, 10,000 pulses are obtained for a stroke of 100 mm, which means 0.01 mm stroke per 1 pulse. These pulses are stored in a known manner in a counter.

For purposes of correction, according to another embodiment of the invention, a digital emitter is arranged on the working spindle of the milling carriage. The spindle in this instance has a pitch of 10 mm. This last mentioned digital emitter emits 250 pulses per revolution; these pulses, when multiplied by four, yield 1,000 pulses per revolution which likewise means 0.01 mm stroke per pulse. These pulses are conveyed to a second counter. The indications of the two counters are subtracted from each other and the obtained difference is conveyed through the digital analog converter, DA-converter, to the thyristor-direct-current power supply unit as correcting voltage.

With this embodiment, the position feeler 3 according to the above mentioned U.S. Pat. No. 3,460,434 Maecker issued Aug. 12, 1975 heretofore converted the position correction between the templet carriage and the control carriage into a correction voltage for the drive of the milling carriage. This position feeler has been replaced by a direct digital position control between the templet carriage and the milling carriage which is likewise converted into a correcting voltage for the milling carriage. In this way the design and construction can be greatly simplified and the precision can be increased.

According to a further embodiment of the invention, also the speed measuring device which is mounted on the templet carriage may be omitted. In such an instance, the digital stroke measuring device by way of a frequency analog converter also will measure the speed. This represents a further simplification and an upgrading of the device. The principal design of the control is not influenced thereby.

The direct current motors which serve as drives for the milling carriage are particularly advantageous with regard to the required high working speeds and their high torques. For instance, when making a crank-shaft milling machine with a copying control device according to the invention, the following is to be taken into consideration. With the elasticity of the direct current drive, the required parts and the costs for controlling the speed will be higher the more narrow the admissible tolerances are as to the circular shape of a crank pin to be milled. The milling carriage also serves for feeding for determining the diameter of the pin. In this connection only short but very precise strokes are to be carried out again, as the case may be, only a tenth or hundredth of a millimeter.

According to a special embodiment of the invention it is, therefore, suggested to drive the milling carriage by an electro-hydraulic stepping motor. Such motors have recently been greatly improved with respect to torque and speed. With this design, the speed measuring device on the templet carriage could be omitted. In such an instance, the above described digital emitter driven by the templet carriage would drive the stepping motor through a customary triggering device with one pulse corresponding to one step of the stepping motor. The arrangement of the digital position control as described above would remain fundamentally unchanged. However, a difficulty is encountered in connection with the compensation for position errors that the difference, which might occur between the templet carriage and the milling carriage, has to be conveyed to the stepping motor for the milling carriage in the form of an additional step pulse.

As far as the working speed range within which the precision of the synchronism is required is within the start-stop frequency of the stepping motor, a direct correction through the stepping motor of the milling carriage spindle is possible at low costs on electronic structural elements. The heretofore known stepping motors with hydraulic amplification have, for instance, a start-stop frequency of up to 2,000 cycles per minute with certain limitations of the nominal torque and of the separate inertiamass-moment squared. With 0.01 mm per step, 2,000 cycles per minute including the correction pulses would correspond to a speed of 20 mm per second or 1.2 m per minute.

This maximum speed is fully sufficient because generally the feeding speed amounts to a maximum of approximately from 600 to 900 mm per minute. Electrohydraulic stepping motors, however, have the drawback that the hydraulic amplifier with increasing frequency will have a slip relative to the electric driving stepping motor. This slip may amount, for instance, to 100 steps at 2,000 cycles per minute. With a stroke control according to which certain points are contacted, this slip is immaterial because when contacting the goal, the speed is reduced to slow speed or crawl speed in which instance the slip eliminates itself. When making a crank-shaft milling machine, which has been selected as example in the present application, it is necessary similar to path controls to correct the slip immediately because a slip of 100 steps already means a lack in position precision of 1 mm. With the operation of a crank-shaft milling machine there exists the fact that at the beginning of the copying milling, in other words at zero degree, the feeding speed increases from zero until at 90° the maximum feeding or advancing speed is obtained which again at 180° prior to the change in the direction becomes zero. It is, therefore, necessary in order to compensate for the slip of the hydraulic stepping motor to effect additional correcting steps from 0° to 90°. The hydraulic motor looses its slip as additional movement only at 90° to 180° in conformity with the reduction in the speed. Consequently, less steps have to be conveyed to the stepping motor at 90° – 180°, in conformity with the compensation of the slip, than the steps coming as rated value from the templet.

According to a further special embodiment of the invention, it is intended for solving this problem to make the digital control device additionally direction sensitive. This means that relative to the difference between the two counter indications, an additional direction signal ± is to be emitted which signal is independent of the direction of the working operation.

Since, as mentioned above, within the start-stop frequency, the torque and the admissible separate inertiamass-movement squared are limited, it may happen that the start-stop frequency has to be selected lower than its maximum value in order to be able to furnish the necessary torque and moments of inertia. It may occur that with the additional difference compensation control the start-stop frequency of the stepping motor is exceeded so that the stepping motor will stop. To avoid this, the rated pulses from the tool carriage and the additional correction pulses from the difference control through a correction logic in an admissible frequency increase have to be conveyed to the triggering device and thereby to the stepping motor. This is effected according to the present invention by conveying the correction pulses to an electronic storing device and by calling off these pulses by a variable cycle control. The control of the cycle control is effected in a continuous analogous manner corresponding to the tendency of the step difference control so that the necessary step frequency required for the correct copying speed will be imparted upon the electric stepping motor through the well known starting control for high frequency. Nevertheless, in this connection it may occur that a correction of the position of the milling carriage with regard to the templet or a compensation of the slip of the stepping motor is no longer possible via the stepping motor itself because possible fast frequency changes through the triggering device are compensated for at too slow a rate in view of the respective working conditions.

According to a further embodiment of the invention, provision is made to drive the nut of the milling carriage spindle in addition to the main drive motor by an electro-mechanical stepping motor. The correction, in other words the difference between the counter of the milling carriage and the counter of the templet carriage, is no longer conveyed to the main stepping motor but rather to a triggering device. The triggering device conveys its pulses correspondingly in conformity with magnitude and direction to the electro-mechanical stepping motor. Thus, in view of the additional rotation of the nut, the difference in stroke is compensated for. The second stepping motor serves only for correcting possible errors in the position or errors with regard to the slip of the electro-hydraulic main drive motor. The second stepping motor has a maximum of 5% of the frequency which is conveyed to the main stepping motor. Accordingly if a maximum of 2,000 cycles per minute is provided for the cycle, the stepping motor for the correction at a maximum is subjected to 100 cycles per minute. For such low frequencies, electro-mechanical stepping motors are commercially available which furnish the necessary torque and moments of inertia.

According to a further embodiment of the invention, the control is so designed that for reducing the load of the correcting motor, the latter receives only one stepping pulse simultaneously with a stepping pulse for the main drive motor. This means that precisely at the higher frequencies at which a slip loss occurs, the main drive motor will already substantially furnish the required torque and moments of inertia so that the correcting motor has to be designed only for a part of this load. This compensation could also be effected in a similar manner by a differential drive.

There exists the possibility by means of a comperator with a preset decade switch to obtain a stopping of the machine. This occurs when the difference between the two counters of the milling carriage and the templet carriage respectively, in other words the position difference of the milling carriage with regard to the templet carriage, becomes too high.

If the relationship in size between the templet and the workpiece or the relationship in length between the templet carriage and the milling carriage is greater or smaller than 1 : 1, then according to the invention to bring about that the generated number of pulses of the digital emitter at the templet carriage and at the milling carriage will coincide by electronic means at the same ratio of size or length.

Also for the workpiece spindle or the drive therefor there exists the possibility to use an electric synchronous movement with regard to the templet shaft. Here the tool spindle shaft works expediently as emitter which imparts upon the receiving shaft of the templet drive the same speed.

According to a further embodiment of the invention, this synchronism can be effected in the same manner as for the described carriage movement. This occurs when the workpiece spindle, in order to obtain any desired angular position, is likewise controlled numerically for dividing purposes. During the division, the templet shaft remains at a standstill inasmuch as it is required only for the copying operation, i.e. for the control of the tool carriage. During the copying movement, the workpiece shaft is driven by its drive motor independently of the dividing numerical system. The emitter on the workpiece shaft for the numerical control of the division is then used during the copying for the synchronism of the templet shaft. In this instance again an emitter on the templet shaft controls this synchronism through a corresponding counting electronic system in cooperation with the counting electronic system of the workpiece shaft by means of a differential control. This difference may be used for correcting the position of the templet shaft and also for controlling and stopping the machine. During the copying operation, the speed of the work piece spindle must be varied in conformity with the removal of material. This is effected in conformity with U.S. Pat. No. 3,460,434 Maecker issued Aug. 12, 1969 through a speed cam which is adapted to the work piece and which has to be produced specifically for this purpose. Inasmuch as for dividing the workpiece spindle there is available already a numerical system, it is possible, in conformity with a further embodiment of the invention, to use this numerical system also during the copying operation in order to indicate or signal the obtained angle in degrees, for instance, when copying by way of milling.

By means of a corresponding electronic system, it would be possible, for instance, every 20° of the rotation of the workpiece to emit a signal which in a known manner is called off through decade switches or a perforated strip and a storing device for the speed of the work piece spindle. These digital factors could be converted through a digital analog converter into the control voltage for the workpiece spindle motor.

In order to enable the operator, depending on the condition of the tool or lack of the workpiece material generally to change the speed level, an additional level switch has to be provided for. This can be effected according to a further development of the invention in such a way that the feeding motor control voltage of the feeding is generated through the digital analog converter and is conveyed through a voltage divider.

If in addition to the workpiece spindle drive, as described, also the milling carriage drive is conveyed through a synchronism relationship into the control device according to the invention, the control device mechanically as to space may be completely separated from the machine, as an independent unit. The interior construction of this device has to be adapted merely to the requirements of the control problems involved. Such control device as a unit may be utilized for each desired machine size of the respective construction.

Referring now to the drawings in detail, the embodiment illustrated therein by way of example shows an electric copying control device for a crank-shaft milling machine, said copying control device being of the type set forth in my above mentioned U.S. Pat. No. 3,460,434 Maecker issued Aug. 12, 1969. Inasmuch as parts are shown in the drawings which correspond to those of the device disclosed in said U.S. Pat. No. 3,460,434, Maecker issued Aug. 12, 1969 also the same numerals have been used. More specifically, according to FIG. 1, the templet 2 is automatically driven by means of the workpiece spindle motor. The templet is followed by the templet carriage 1 which through a rack drives the rated speed measuring device 6 (Tacho). The direct voltage generated in this way is conveyed to the direct voltage network device 6.1 which conveys a corresponding operating voltage to the direct current motor 12.2 for the milling carriage 12. Simultaneously, with the speed measuring device 6, the templet carriage 1 drives a rated digital emitter 6.3 with 2,500 pulses per revolution and more specifically, through a pinion with a revolution equaling 100 millimeters. The pulses of the emitter 6.3 are multiplied by 4 in a pulse multiplier 6.4. Thereupon, in the direction logic 6.5, the direction is recognized, and the pulses are conveyed to a counter 6.6. On the spindle 12.1 of the milling carriage 12 there is located an actual — digital emitter 12.3 with 250 IpU corresponding to a pitch of 10 millimeters of the milling carriage spindle 12.1. The pulses of the emitter 12.3 are likewise conveyed to a pulse multiplier 12.4 of a direction logic 12.5 and to a counter 12.6. The outputs of the two counters 12.6 and 6.6 are conveyed to a calculator 8.1 which ascertains a possible difference between the counters 12.6 and 6.6 according to size and direction. This difference is delivered and passed through a digital analogue converter 8.5. The output of this converter 8.5 as correction voltage is conveyed to the direct voltage power supply unit or network device 6.1.

By means of a decade switch 8.4 the number of error pulses can be set so that if this number is exceeded, the comparator 8.2 emits a disorder signal 8.3.

Figure 2:
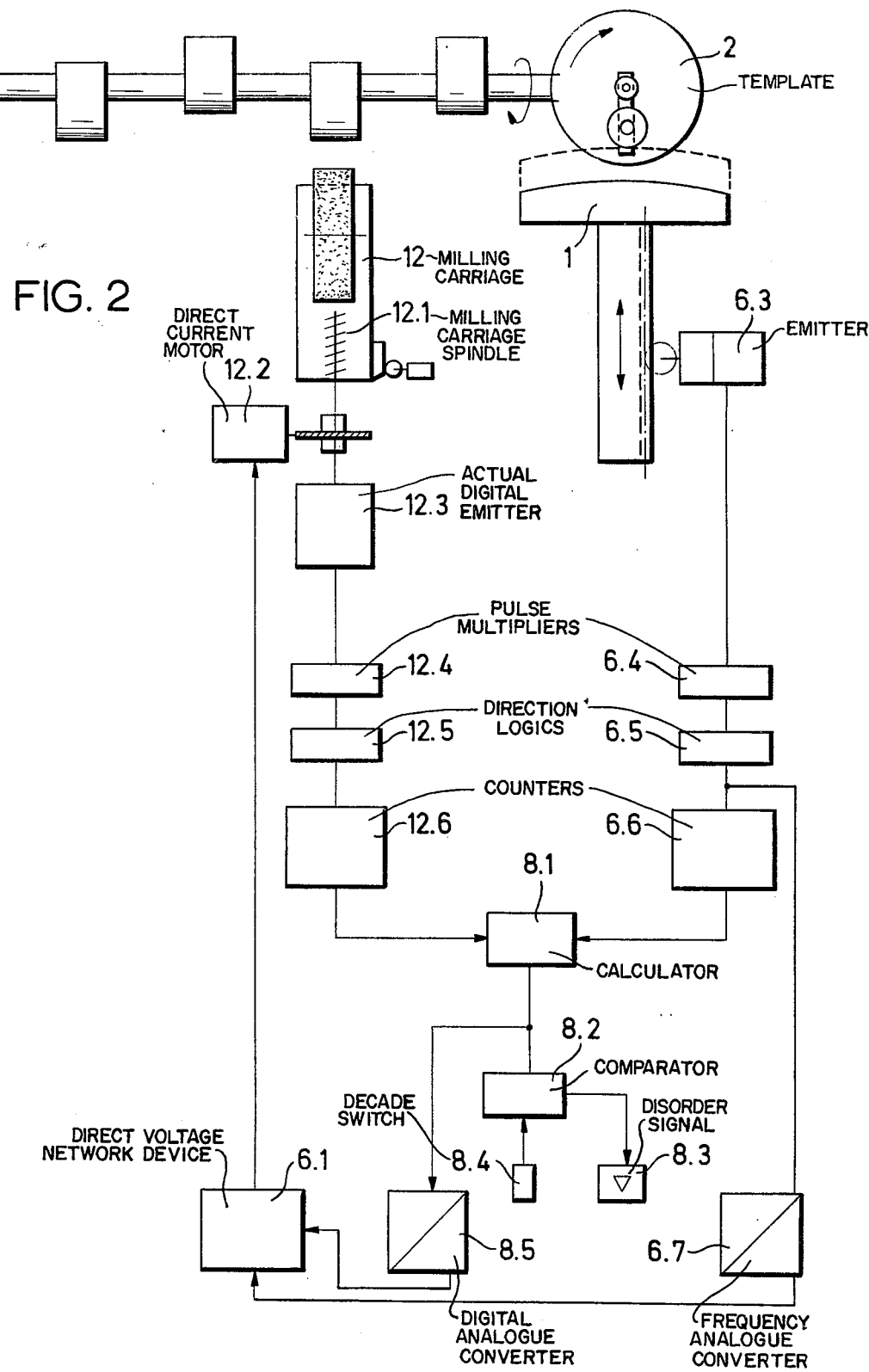
FIG. 2 shows the employment of the digital emitter on the templet carriage as speed measuring device in combination with a frequency analog-digital converter with an arrangement according to FIG. 1.

According to the embodiment of FIG. 2, no speed measuring device is provided. The pulses which are emitted by the rated digital emitter 6.3 and after being multiplied by are conveyed 4, by means of the pulse multiplier 6.4 following the direction logic 6.5 to a frequency analogue converter 6.7. Converter 6.7 then through the intervention of the direct current power supply unit 6.1 will generate the voltage for the basic speed of the direct current drive motor 12.2. In this connection, a multiplication of the pulses might be necessary for a sufficient control voltage within the speed range near zero. The control device is the same as in FIG. 1.

Figure 3:
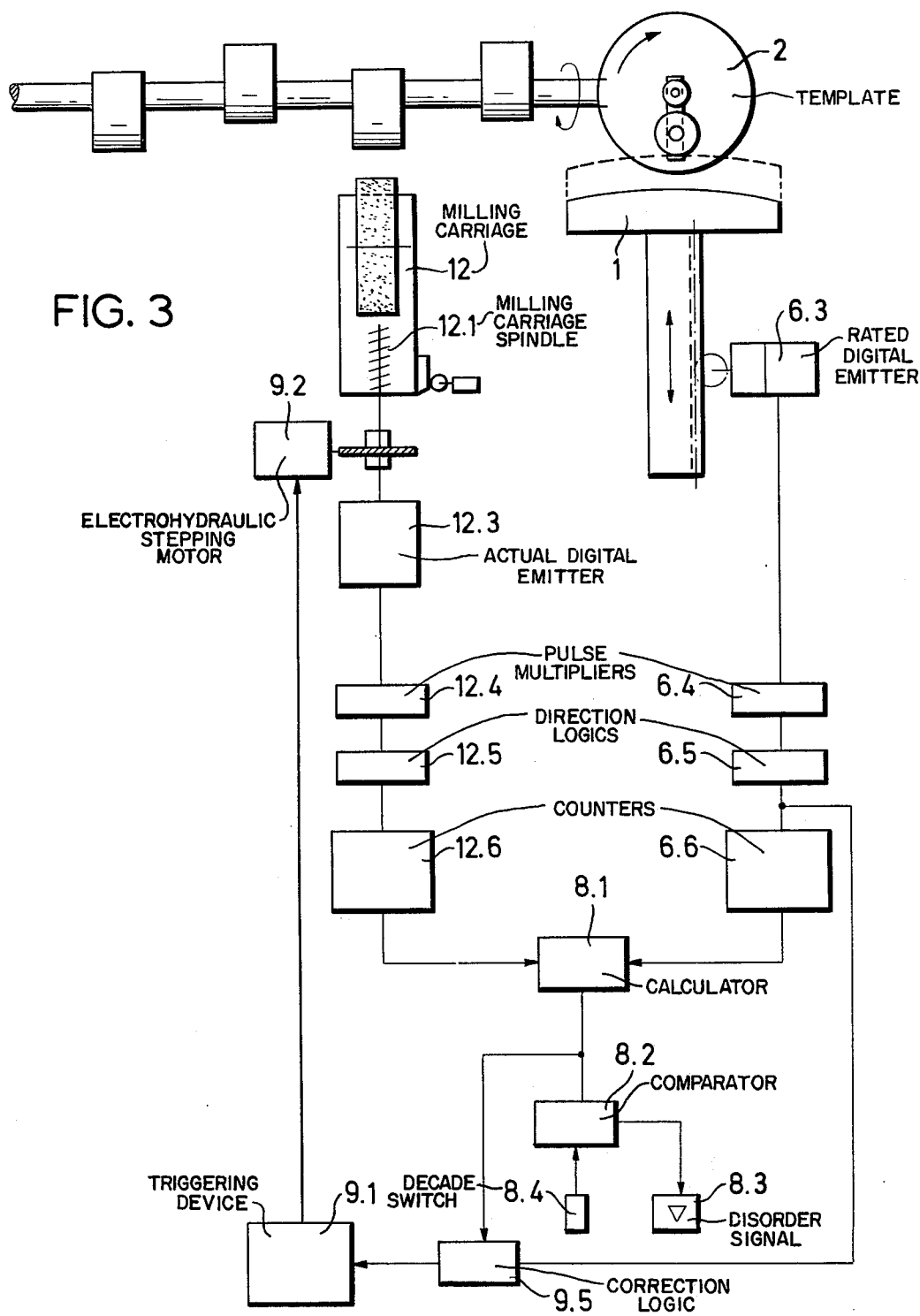
FIG. 3 represents the synchronism circuit with an electro-hydraulic stepping motor.

According to FIG. 3, an electro-hydraulic stepping motor 9.2 is provided for driving the milling carriage 12. One step means or represents for instance 100th of a stroke of 1 millimeter of the milling carriage 12. The digital emitter 6.3 on the templet carriage 1 now directly through a correction logic 9.5 conveys its pulses to a triggering device 9.1. These pulses generate a corresponding number of steps of the electrohydraulic stepping motor 9.2. The control device corresponds substantially to that of FIG. 1. The milling carriage 12 likewise has an actual — digital emitter 12.3. The pulses of the emitter 12.3 as well as of the rated digital emitter 6.3 on the templet 2 are compared to each other through the two counters on the milling carriage 12.6 and on the templet carriage 6.6 as well as by the counter 8.1. The ± difference furnished by the calculator 8.1 is conveyed to the correction logic 9.5 thereby producing an increase or a decrease in the steps relative to the number of the steps prescribed by the rated-digital emitter 6.3.

Figure 4:
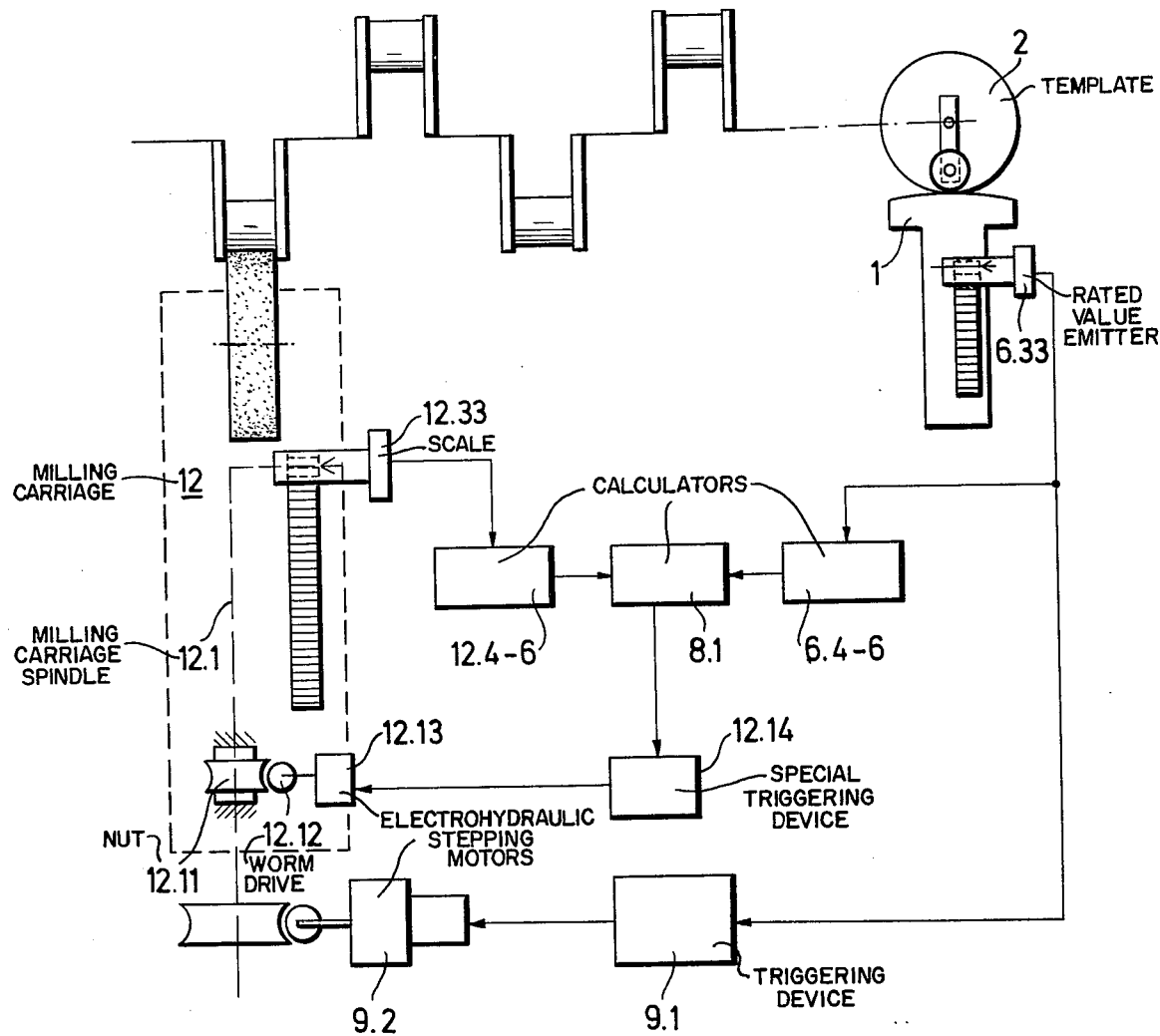
FIG. 4 shows the synchronism circuit with an electro-hydraulic stepping motor and with an additional correction stepping motor for driving the nut of the milling carriage.

According to FIG. 4, the nut 12.11 of the milling carriage spindle 12.1 which advances and retracts the milling carriage 12 additionally comprises a worm drive 12.12 with an electromechanical stepping motor 12.13. Thus by turning the nut 12.11 also a change in the speed may be effected in addition to the main drive 9.2.

The difference furnished by the calculator 8.1 is conveyed to a special triggering device 12.14. This device conveys its pulses in conformity with magnitude and direction to the electromechanical stepping motor 12.13.

As mentioned above, the ratio as to size between templet and workpiece or the ratio as to length between templet carriage and milling carriage may be greater or less than 1:1. In FIG. 4 it is shown that the templet 2 has only half the diameter of the workpiece so that the templet carriage 1 has only half the stroke and thereby also only half the speed as the milling carriage 12. The ratio as to size between workpiece and templet 2 may, of course, also be different. It is essential in this connection that the number of the rated pulses at the rated value emitter 6.33 in FIG. 4 (illustrated as optical or inductive scale) is again brought into the mutual correct relationship by the actual impulses which the scale 12.33 releases on the milling carriage 12. When both scales have, for instance, the unit 0.01 millimeters stroke per pulse, accordingly at the milling carriage 12 twice the stroke is effected per pulse. Then with the same scale division, the doubled number of pulses will result as the actual value. This pulse number has to be divided by two by an electronic control prior to said pulse number reaching the calculator 8.1 from the calculator 12.4-6.

Figure 5:
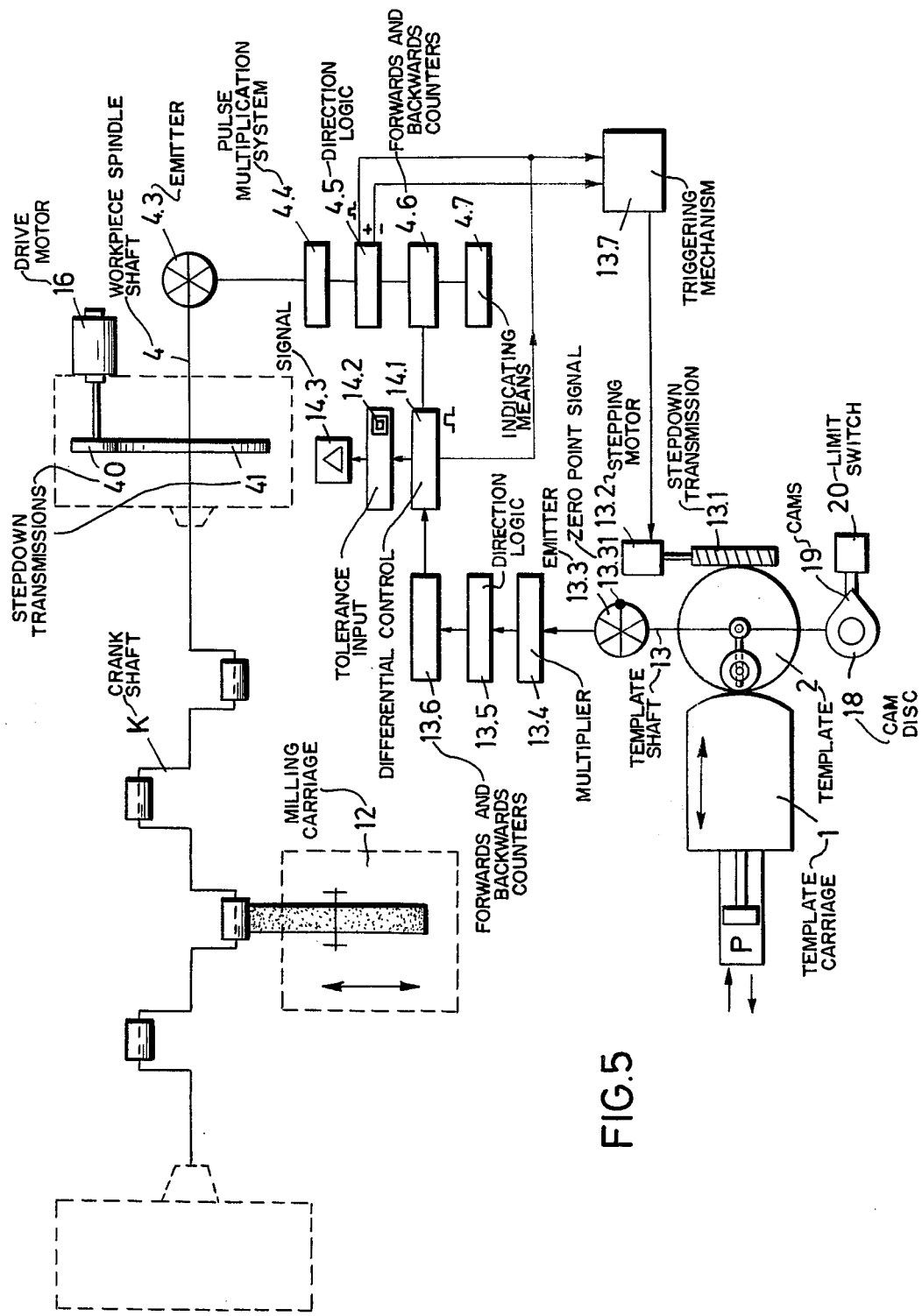
FIG. 5 shows an electric shaft between the workpiece spindle and the templet shaft.

FIG. 5 shows an electric synchronous operation system for the workpiece spindle 4 or its drive 16 to the templet shaft 13.

The workpiece spindle 4 is driven by motor 16 through a stepdown transmission 40/41. The same prior to its working must start with the crank-shaft milling machine shown by way of example in a manner divided into the angular position which corresponds to the base position of the templet of the crank-pin to be milled. With large machines, it is possible for these crank-pins with the various workpieces to make necessary a great number of different angular positions. Therefore, it is expedient to control this division or pitch numerically.

According to the invention these numerical control means are used for solving the synchronous running arrangement according to FIG. 5. In this connection the shaft 4 is likewise provided with an emitter 4.3 which, however, must furnish a total of 36,000 IpU in conformity with the dividing precision of 0.01°. It makes no difference as is the case with optical emitters whether these signals are generated directly or whether for instance only 9000 pulses are generated by the emitter 4.3, and these pulses are then quadrupled electronically. The emitter 4.3, for purposes of dividing will emit its signals to an electronic system this system comprises a pulse multiplication system 4.4, a direction logic 4.5, forward and backwards counters 4.6 and indicating means 4.7 with preselection setting for the desired angular position.

In this connection it is to be noted that the numerical control of shaft 4 is required only for dividing the workpiece spindle 4 into angular positions at random. However, the numerical control of shaft 4 is not necessary for driving the workpiece spindle during the actual copying milling operation for which at each time only one revolution of shaft 4 is necessary.

According to a further embodiment of the invention, this numerical control is utilized for the synchronous drive of the templet shaft 13 during the copying milling. To this end, the templet shaft 13 is provided with a stepping motor 13.2 as drive. When starting with a stepping motor with 200 steps per revolution, there are obtained 36,000 IpU on the tool spindle, 180 revolutions on the stepping motor. Thus, between the stepping motor 13.2 and the templet shaft 13 there has to be provided a step-down transmission 13.1 with a step-down ratio of 1:180 in order to be sure that the shaft 13 precisely will make one revolution when the shaft 4 has made one revolution. On shaft 13 of the templet 2 there is arranged an emitter 13.3 which with one revolution emits the same pulse number namely 36,000 IpU as the emitter 4.3 emits to the workpiece spindle 4, if desired through a multiplier 13.4.

Instead of this solution, the emitter 13.3 may also be arranged on the shaft of the stepping motor 13.2 while having only to emit 200 pulses per revolution.

The synchronous movement of the workpiece spindle 4 and the templet shaft 13 are checked by an electronic system comprising a multiplier 13.4 and a direction logic 13.5, forward and backward counters 13.6 and a differential control 14.1 with the electronics of the workpiece spindle 4. In the same manner as with the milling carriage synchronism, also in this instance by a tolerance input 14.2, a signal 14.3 is emitted for the control of the machine or stopping of the machine when the said tolerance is exceeded. In the same manner, the occurring difference for purposes of correction again has to be conveyed to the triggering mechanism 13.7 for the stepping motor 13.2 as has been described in connection with the milling carriage control.

During the dividing therefore the emitter 4.3 does not emit any signals to the stepping motor 13.2 but serves only for controlling the dividing of the workpiece spindle shaft 4 to a certain angle position. Inversely, during the copying, the emitter 4.3 is used so that the stepping motor 13.2 through the transmission 13.1 will drive the shaft 13 in synchronism with the shaft 4.

It is to be noted that for copying purposes precisely one revolution of shaft 4 is necessary. In order to assure this, a cam disc 18 with cams 19 is arranged on shaft 13. This cam disc actuates the limit switch 20 (see FIG. 5). The limit switch 20 is actuated only in the position 0°/360°. The stop is effected at 360°, in other words is effected during the copying milling by stopping the control of the drive motor 16 for the workpiece spindle through the precisely adjustable limit switch 20. Previously, a shift over to crawl speed is effected in order to obtain in corresponding stopping precision. On the other hand, during the dividing, this end switch 20 must have been actuated in the position 0°/360° because this position applies for each new angular position of the shaft as zero reference point (basic position) for the copying milling of the pin.

It is important that at any time the assurance will exist that after completing the copying milling, the number of 3,600 pulses has actually been carried out through the stepping motor 13.2 by the templet shaft 13. This will be checked on one hand by the limit switch 20 and on the other hand by the counter of the electronic system which means in other words this will be checked twice.

The optical and inductive emitters may be equipped with a socalled zero point. Thus at a certain position of the emitter within the 360° at any time operation can be started at crawl speed which is then characterized or indicated by a special signal as zero point. If, as to the electric shaft for instance the emitter 13.3 is arranged on the templet shaft 13, this emitter, according to a further embodiment of the invention may be provided with a zero point signal 13.31. This zero point would have to be mechanically produced at a very high precision (1:36000 = 0.01°) and would be electronically started. This means there is necessary a considerably higher precision than can be obtained by cam disc 19 and limit switch 20. The counting logic of the emitter 13.3 additionally may be so designed that it will be set to the number 36,000 in conformity with the angle unit of 0.01° for 360°, when the command workpiece rotation for copying milling is given. This number according to the angular movement is reduced by the pulses of the emitter 13.3 in the direction toward zero. In this way through decade switch, series (Vorschalt) signals, for instance, at the position 350° equal 10° ahead of 0 = 1,000, pulses ahead of zero are emitted which for switching down the speed of the workpiece spindle to crawl speed can be used for precisely moving in to 360°/0°. Also this taking advantage of the zero point brings about a mechanical simplification of the copying device.

The numerical control of the dividing in conformity with a further embodiment of the invention is used simultaneously instead of the speed control of the workpiece spindle 4 this is done in order to put in through a cam the speeds numerically in conformity with predetermined angles of the control for the workpiece spindle drive 16. During a revolution of the workpiece spindle 4, speed thereof must be controlled because the proportion of the material to be milled off changes continuously. The speeds also depend on whether the pin of a crank-shaft is milled or the jaw of the pin is milled. Depending on the size and shape of the workpiece, the speeds can be calculated which are admissible in the various angular positions of the workpiece (viewed in the direction toward the cutter). When utilizing a numerical control for dividing the workpiece spindle, for each angle during the copying operation the corresponding speed is put into a decade switch or into a belt or tape. Experience has shown that approximately 18 angular positions will suffice which means that after each 20° the speed for the workpiece spindle 4 is put in anew.

Figure 6:
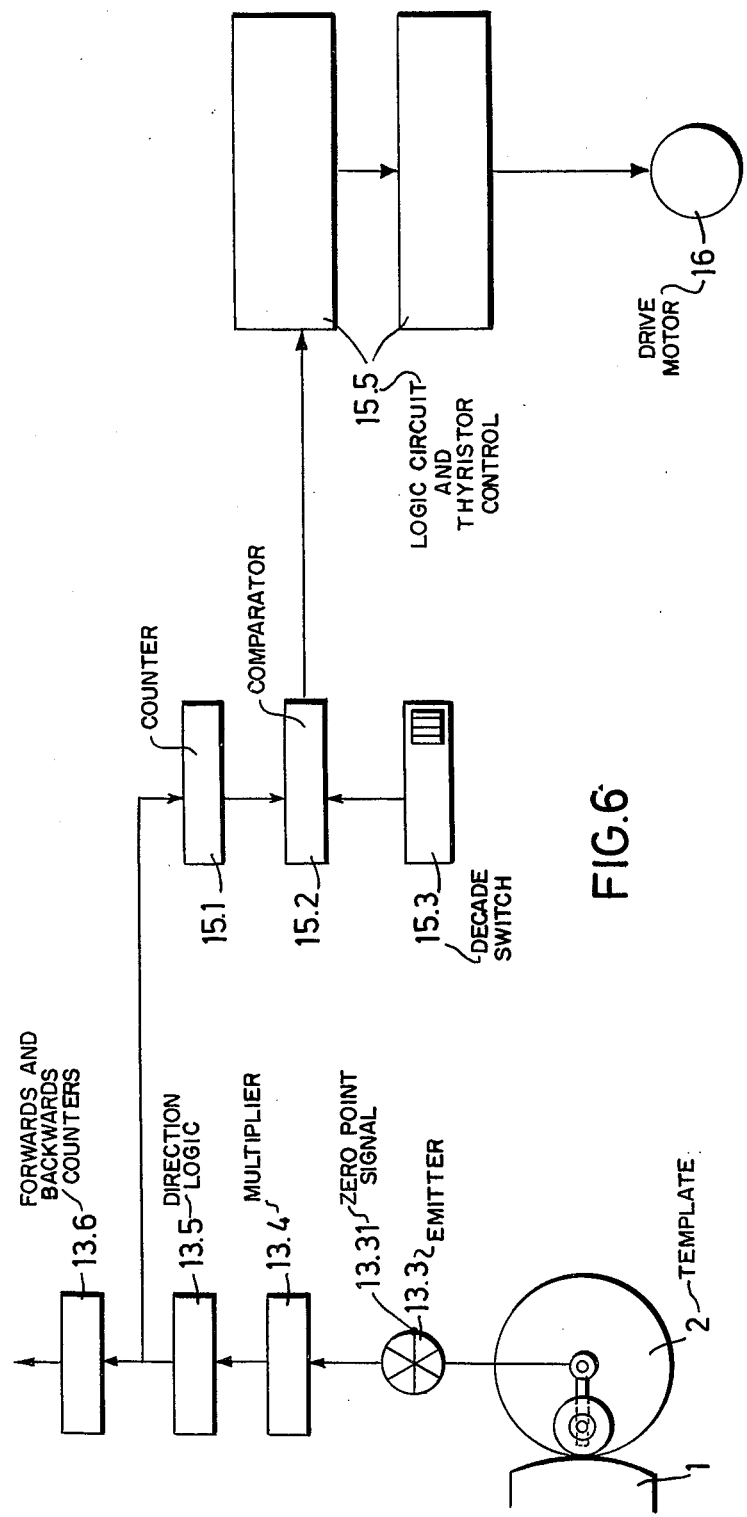
FIG. 6 shows a speed control of the workpiece spindle motor by means of digital pre-input.

This is effected according to the embodiment of FIG. 6 in such a way that the pulses are conveyed from an emitter 13.3 to a counter 15. and to a comparator 15.2 to which a decade switch 15.3 is connected for setting the angular size for instance 20.00°. This means that each time when 2,000 pulses have been received = 20.00°, a signal is emitted. This signal through a corresponding logic circuit and a thyristor control 15.5 and through a speed decade switch or through corresponding storage means of a perforated belt or tape will make effective predetermined speeds of the workpiece spindle.

By means of the zero point 13.31 of the emitter 13.3, the mechanical position is fixed for the start of the copying milling relative to the workpiece. In this way, also by a corresponding locking system there can be assured that in this position of the emitter the speed chain starts.

By utilizing the two electric shafts according to FIGS. 1 and 5, a considerable mechanical simplification of the entire copying arrangement will be obtained. The advantage is obtained that for all machines of the same construction but different sizes and milling outputs, the same copying device can be used. With regard to the U.S. Pat. No. 3,460,434 Maecker issued Aug. 12, 1969 which has been considered as the state of the art as far as the present application is concerned a considerable simlification has been realized by the present invention. This will be particularly obvious when comparing FIG. 3 of applicant's U.S. Pat. No. 3,460,434 Maecker issued Aug. 12, 1969 with FIG. 7 of the present disclosure. The present invention makes it possible for the first time to build the copying device as a unit completely separate from the machine.

Figure 7:
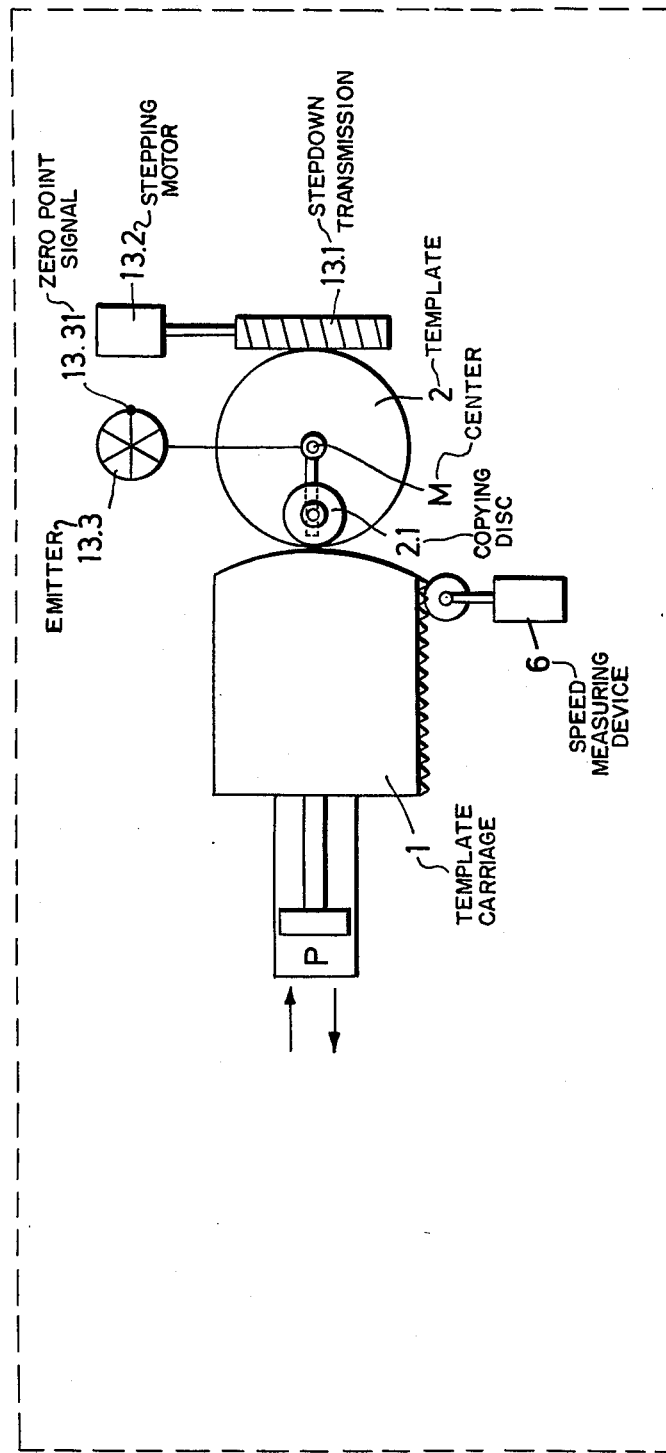
FIG. 7 illustrates the arrangement of a copying device which is separated from the machine as to space and mechanical connection.

According to FIG. 7, the copying device as to its principal structure now only consists of the template carriage 1, the template 2, the template shaft 13 with the control emitter 13.3, and the step-down transmission 13.1 with the stepping motor 13.2 depending on and in synchronism with the tool spindle. For the copying control of the feed motor 12.2 there is utilized the speed measuring device 6 which imparts the basic speed upon the feed motor 12.2 in conformity with the movement carried out by the template carriage 1 when following the template 2. The template 2 is designed very simple for crank pins because the diameter of the copying disc 2.1 must correspond to the diameter of the work piece and because the crank stroke ( distance crank pin-center line of crank shaft) on the template 2 is determined by the distance of the copying disc 2.1 from the center M of the template 2. Thus, by changing the diameter of the copying disc and its distance, the template 2 can easily be adjusted for different crank pins. While, when milling bearing pins, the copying stroke disc eliminated, it is possible by setting a sisc in the center of the template, to determine the diameter of the bearing pin. Only when milling jaws will be necessary to make models corresponding to the desired shape of the workpiece. In addition to carrying out the copying operation actually, the copying device also determines the respective zero position of the basic position for the start of the copying milling of the various pins of the crank shaft K, and also takes care of the control of the speed of the drive motor 16.

It is, of course, to be understood that the present invention is, by no means, limited to the specific showing in the drawings but also comprises any modifications within the scope of the appended claims.

What is claimed is:

1. An electric copying control device in a completely separate unit for crankshaft cutting machines including a cutting carriage working with a coordinate relative to a workpiece spindle and with which a template carriage follows a template driven by way of a workpiece spindle motor, whereby the template carriage drives means for regulation of speed of feed drive and additionally means are provided for control of position of the cutting carriage relative to the template carriage, the improvement of combination therewith which comprises: electrical synchronizing means provided to assure non-mechanical interconnection between the template and the workpiece spindle on one hand and the template carriage and cutting carriage on the other hand to assure exact synchronization thereof relative to each other, and a single electrical measuring means providing electrical signals therewith utilized to represent on one hand a rated value for speed regulation of drive for copying feed of the cutting carriage and on the other hand serving to control position of the template carriage relative to the cutting carriage in an electrical position control regulation.

2. An electric copying control device in combination according to claim 1 in which there is included a template shaft and a drive motor is provided to drive the workpiece spindle during copying movement, an emitter arranged upon the workpiece spindle and operable numerical control of synchronization of the template shaft, a further emitter upon the template shaft, electronic counter means and a differential control system to monitor synchronization whereby differences arising are used for correction of position of the template relative to the workpiece spindle and also for further control indications and objectives.

3. An electronic copying control device in combination according to claim 2 in which a stepping motor is provided having a shaft upon which said further emitter is arranged and only 200 pulses per rotation need to be emitted thereby.

4. An electronic copying control device in combination according to claim 1 in which only a single digital emitter means is driven by the template carriage, a direct current motor, a counter and a frequency analogue converter means to generate voltage for ground speed of the direct current motor and simultaneously for digitally supplying the counter for position control.

5. An electric copying control device in combination according to claim 1 in which digital emitter means are arranged on a shaft of a drive spindle of the cutting carriage, counter means arranged to receive pulses from said digital emitter means according to which subtraction occurs, a digital analogue converter means and thyristor direct-current network device cupplied with difference in value from said counter means as a correction voltage.

6. An electronic copying control device in combination according to claim 4 in which a stepping motor means is provided and an electro-hydraulic stepping motor drives the cutting carriage, an electronic logic circuit means for digital measurement of differences encountered between positions of the template carriage and the cutting carriage and for effecting corresponding increase or decrease of rated impulse frequency of said digital emitter means, and a triggering device for the stepping motor means having corrected pulse frequency supplied thereto.

7. An electronic copying control device in combination according to claim 6 in which means are provided for checking and emitting a warning-stopping signal when a preset tolerance has been exceeded.

8. An electronic copying control device in combination according to claim 7 in which a nut of the cutting carriage spindle effects shifting of the cutting carriage, an electromechanical stepping motor that drives said nut supplementarily to said stepping motor means, an electrical differential circuit means and a triggering means supplied with difference of counter means and of electrical differential circuit means so that resulting pulses thereof are transmitted according to magnitude and direction to said electro-mechanical stepping motor.

9. An electronic copying control device in combination according to claim 1 in which collectively copying and control devices for the machine are set up mechanically and spatially independent thereof though having measurements capable of handling forces arising for control and copying objectives thereof.

* * * * *